(12) United States Patent
Veatch et al.

(10) Patent No.: US 9,684,130 B2
(45) Date of Patent: Jun. 20, 2017

(54) FIBER OPTIC CONNECTOR WITH POLARITY CHANGE

(75) Inventors: Anthony Veatch, Morris, CT (US);
John A. Siemon, Woodbury, CT (US);
Johnny Zheng, Jiangsu (CN); Alex Yao, Shanghai (CN); Scott Nagel, Trumbull, CT (US)

(73) Assignee: THE SIEMON COMPANY, Watertown, CT (US)

( * ) Notice: Subject to any disclaimer, the term of this patent is extended or adjusted under 35 U.S.C. 154(b) by 8 days.

(21) Appl. No.: 14/115,459

(22) PCT Filed: May 1, 2012

(86) PCT No.: PCT/US2012/035934
§ 371 (c)(1),
(2), (4) Date: Mar. 7, 2014

(87) PCT Pub. No.: WO2012/151175
PCT Pub. Date: Nov. 8, 2012

(65) Prior Publication Data
US 2014/0169727 A1    Jun. 19, 2014

Related U.S. Application Data

(60) Provisional application No. 61/482,265, filed on May 4, 2011, provisional application No. 61/567,726, filed on Dec. 7, 2011.

(51) Int. Cl.
*G02B 6/27* (2006.01)
*G02B 6/38* (2006.01)

(52) U.S. Cl.
CPC .......... *G02B 6/2726* (2013.01); *G02B 6/3831* (2013.01); *G02B 6/3879* (2013.01); *G02B 6/3825* (2013.01)

(58) Field of Classification Search
CPC ........................... G02B 6/3879; G02B 6/3831
See application file for complete search history.

(56) References Cited

U.S. PATENT DOCUMENTS

| 5,123,071 A | 6/1992 | Mulholland et al. |
| 5,315,679 A | 5/1994 | Baldwin et al. |

(Continued)

FOREIGN PATENT DOCUMENTS

| CN | 2867293 Y | 2/2007 |
| EP | 2063497 A1 | 5/2009 |

(Continued)

OTHER PUBLICATIONS

European Partial Search Report for application EP 12779744, dated Apr. 15, 2015, 3 pages.

(Continued)

*Primary Examiner* — Omar R Rojas
(74) *Attorney, Agent, or Firm* — Cantor Colburn LLP

(57) ABSTRACT

A fiber optic connector includes a boot receiving an optical fiber; a connector body for receiving the optical fiber and terminating the optical fiber; and a latch coupled to the connector body, the latch for engaging an adapter for receiving the fiber optic connector, the latch repositionable relative to the connector body to enable polarity change of the fiber optic connector without changing a relative position of the connector body and the optical fiber.

24 Claims, 17 Drawing Sheets

(56) References Cited

U.S. PATENT DOCUMENTS

| | | | |
|---|---|---|---|
| 5,335,301 | A | 8/1994 | Newman et al. |
| 5,481,634 | A | 1/1996 | Anderson et al. |
| 5,574,812 | A | 11/1996 | Beier et al. |
| 5,579,425 | A | 11/1996 | Lampert et al. |
| 5,675,682 | A | 10/1997 | De Marchi |
| 6,024,498 | A | 2/2000 | Carlisle et al. |
| 6,076,974 | A | 6/2000 | Carlisle et al. |
| 6,196,733 | B1 | 3/2001 | Wild |
| 6,250,817 | B1 | 6/2001 | Lampert et al. |
| 6,276,839 | B1 | 8/2001 | De Marchi |
| 6,325,547 | B1 | 12/2001 | Cammons et al. |
| 6,357,934 | B1 | 3/2002 | Driscoll et al. |
| 6,435,732 | B1 * | 8/2002 | Asao et al. ............... 385/78 |
| 6,863,556 | B2 | 3/2005 | Viklund et al. |
| 7,163,414 | B2 | 1/2007 | Lo et al. |
| 7,297,013 | B2 | 11/2007 | Caveney et al. |
| 7,326,075 | B1 | 2/2008 | Armstrong et al. |
| 7,421,181 | B2 | 9/2008 | Kanou et al. |
| 7,440,670 | B2 | 10/2008 | Kanou et al. |
| 7,465,180 | B2 | 12/2008 | Kusuda et al. |
| 7,632,125 | B2 | 12/2009 | Irwin et al. |
| 7,641,398 | B2 | 1/2010 | O'Riorden et al. |
| 8,152,384 | B2 | 4/2012 | de Jong et al. |
| 8,152,385 | B2 | 4/2012 | de Jong et al. |
| 8,221,007 | B2 | 7/2012 | Peterhans et al. |
| 2003/0220008 | A1 | 11/2003 | Viklund et al. |
| 2004/0247252 | A1 | 12/2004 | Ehrenreich et al. |
| 2005/0058404 | A1 | 3/2005 | Ngo |
| 2006/0049826 | A1 | 3/2006 | Daneman et al. |
| 2006/0089039 | A1 | 4/2006 | Caveney et al. |
| 2008/0226237 | A1 | 9/2008 | O'Riorden et al. |
| 2009/0047818 | A1 | 2/2009 | Irwin et al. |
| 2009/0245732 | A1 | 10/2009 | Murano |
| 2010/0220961 | A1 * | 9/2010 | de Jong et al. ............... 385/77 |
| 2011/0091159 | A1 | 4/2011 | de Jong et al. |

FOREIGN PATENT DOCUMENTS

| | | |
|---|---|---|
| EP | 2144100 A1 | 1/2010 |
| JP | 2003526116 A | 9/2003 |
| WO | 2004065999 A2 | 8/2004 |
| WO | 2012054174 A1 | 4/2012 |
| WO | 2015103783 A1 | 1/2014 |

OTHER PUBLICATIONS

International Preliminary Report on Patentability for application PCT/US2012/035934, dated Mar. 25, 2014, 6 pages.

Office Action from the Taiwan Intellectual Property Office for application 10421551940, Nov. 19, 2015, 9 pages.

Chinese Office Action for application CN 201280020179.6, dated Sep. 30, 2016, 10 pages.

* cited by examiner

FIBER OPTIC CONNECTOR WITH POLARITY CHANGE

BACKGROUND OF THE INVENTION

Fiber optic connectors are used to terminate fiber optic cable. One format for a fiber optic connector is the LC format. Existing LC connectors have a latch that must be depressed. In high-density applications it can be difficult for users to get their fingers into tight spaces to depress the latch. To address this issue, existing LC connectors utilize a "push-pull" mating mechanism to activate the LC latch. These push-pull designs use a traditional LC body/latch combination, which increases the overall connector height, and also typically require the user to grasp a duplex clip to release the latch, which is far forward near the congested mating area.

With fiber optic cable termination, it is sometimes necessary to change polarity of the connection. Existing uniboot connectors either do not allow polarity changes or make it difficult for the user to make a change. Polarity changes on these connectors require disconnecting the connector from a clip, and rotating the connector. This rotation of the connector simultaneously rotates the fiber, placing strain on the fiber. This requires numerous steps to be performed by the user, and also exposes the sensitive fiber to damage, particularly in the field where conditions are variable.

DETAILED DESCRIPTION

Embodiments of the invention provide a push-pull LC duplex fiber connector that allows the connector to be more easily unlatched from its mating adapter when compared with a traditional LC connector. The connector includes a separate latch clip that enables the polarity to be changed without rotating the individual connectors, eliminating the need to twist the fibers, resulting in easier field polarity changes and a more reliable connection.

Figure 1:
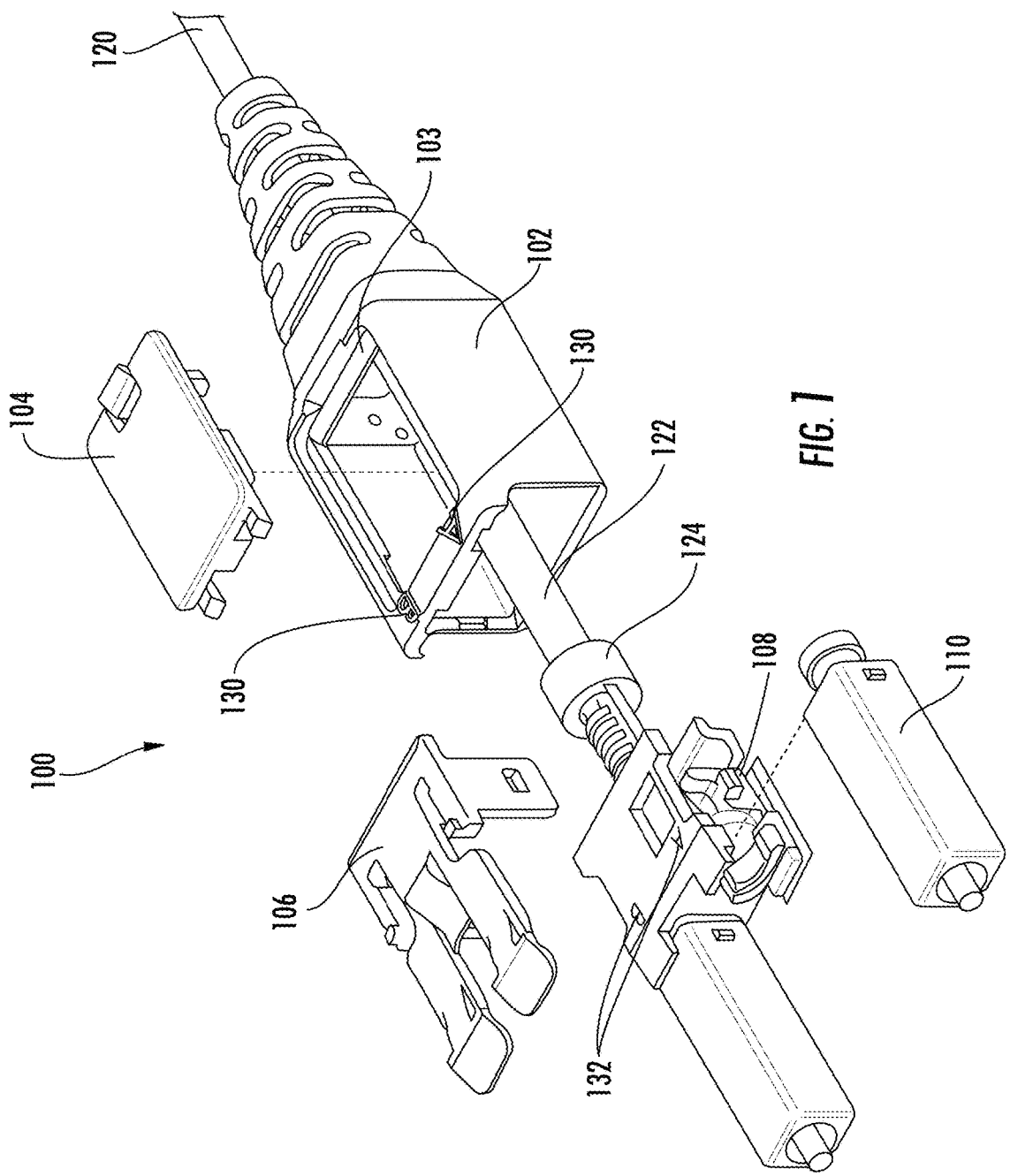
FIG. 1 is an exploded, perspective view of a connector in an exemplary embodiment.

FIG. 1 is an exploded, perspective view of a connector 100 including a boot 102, cover 104, latch 106, fiber holder 108, and connector bodies 110. The connector bodies 110 are latchless, LC type connector bodies. It is understood that embodiments may use different connector bodies, and the invention is not limited to LC type connections. A cable 120 runs through boot 102 and includes two optical fibers. Heat shrink material 122 encases at least a portion of cable 120 and a crimp ring 124 is secured to cable 102. Connector bodies 110 terminate the two optical fibers in cable 120. The connector bodies 110 are latchless, as latch 106 is used to secure the connector 100 to an adapter.

Figure 2:
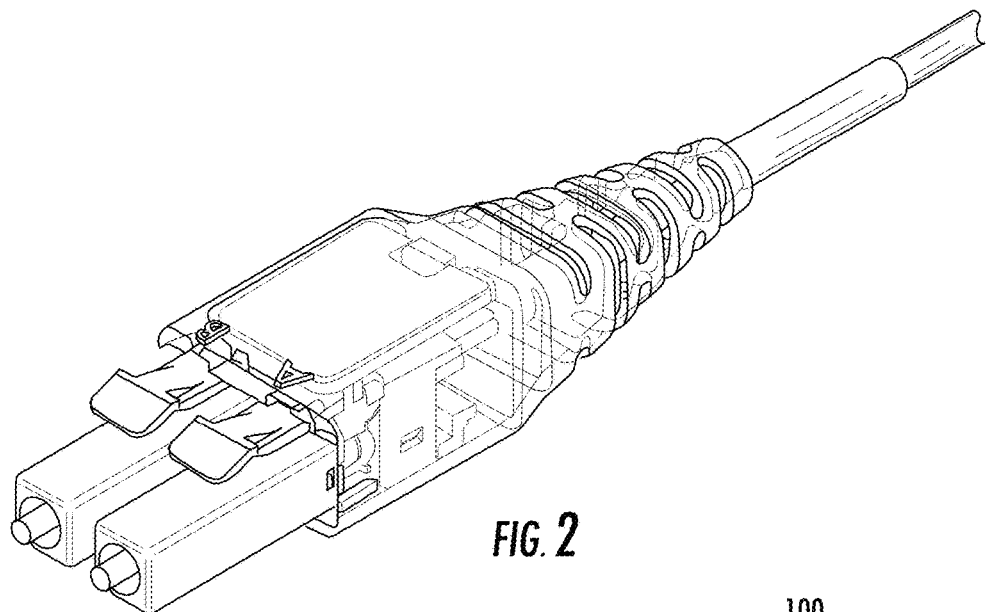
FIG. 2 is a perspective view of the connector of FIG. 1 assembled.
Figure 3:
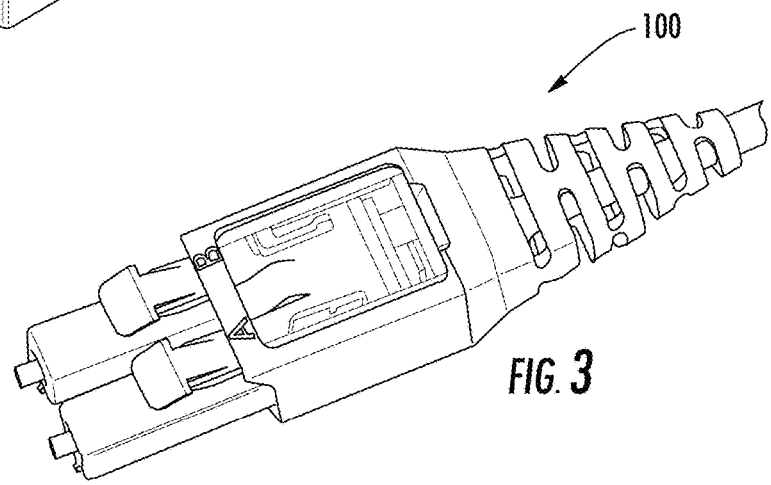
FIG. 3 is a perspective view of the connector of FIG. 1 with the cover removed.

Boot 102 includes boot polarity indicia 130, which includes two letters, but may include any type of symbol, color coding etc. Similarly, fiber holder 108 includes fiber holder polarity indicia 132, which may match the boot polarity indicia 130. Fiber holder 108 may include fiber holder polarity indicia 132 on both the top and bottom surfaces of the fiber holder 108. The boot polarity indicia 130 and the fiber holder polarity indicia 132 indicate the polarity of the connector, depending upon whether the boot polarity indicia 130 and the fiber holder polarity indicia 132 are aligned or not (e.g., whether letters A and B are matched or not). FIG. 2 is a perspective view of the assembled connector 100. FIG. 3 is a perspective view of the assembled connector 100, with cover 104 removed.

Figure 4:
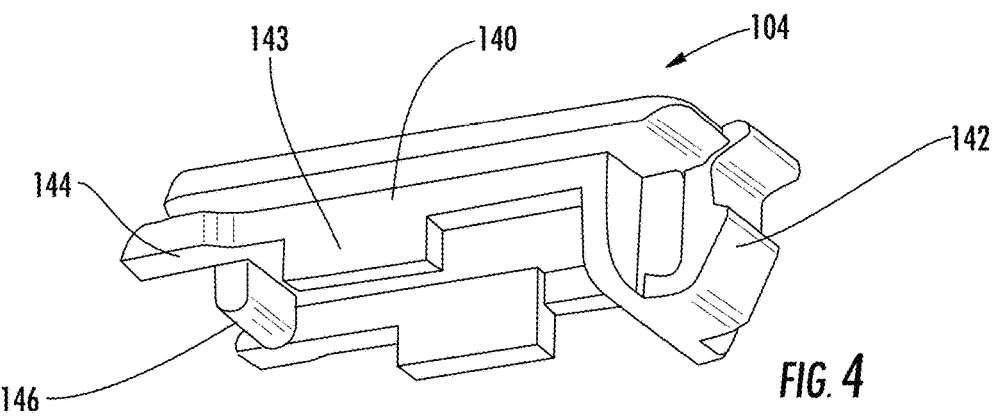
FIG. 4 is a perspective view of a cover in an exemplary embodiment.

FIG. 4 is a perspective view of the cover 104. Cover 104 includes a generally rectangular cover body 140. Extending from a rear of cover body 140 is a resilient latch 142. Latch 142 secures the cover 104 to body 102. A front edge of body 140 includes fingers 144 that extend away from cover body 140. As shown in FIG. 1, cover 104 is received in a cutout 103 in boot 102. Fingers 144 are positioned under one edge of the cutout and latch 142 engages another edge of the cutout. To remove the cover, latch 142 is defeated using a finger or a tool. Tabs 143 extend below cover body 140 and travel in slots 155 (FIG. 5) of latch 106 to limit travel of the boot 102 relative to the fiber holder 108.

Figure 5:
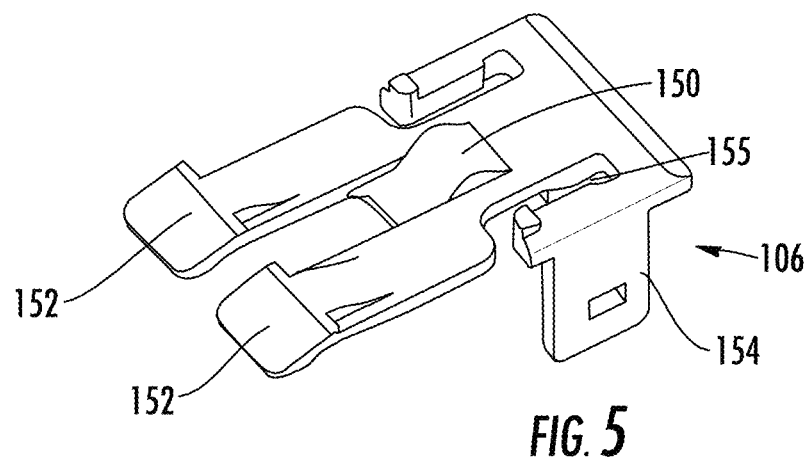
FIG. 5 is a perspective view of a latch in an exemplary embodiment.

Cover 104 also includes a nub 146 extending downwards from an underside of cover body 140. Nub 146 coacts with a ridge 150 on latch 106 (FIG. 5). Latch 106 includes resilient arms 152 that engage mating structure on an LC adapter. Arms 152 extend forward, away from boot 102, along the axis of insertion of the connector 100 with an adapter. As such, connector 100 has a lower profile than existing connectors having latches that extend up and rearward. Arms 152 are integral with ridge 150, and deflect when ridge 150 is deflected as described herein. Latch 106 also includes mounting tabs 154 that secure the latch 106 to fiber holder 108.

Figure 6:
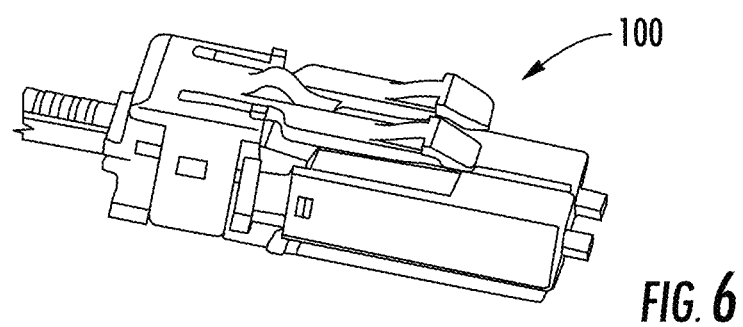
FIG. 6 is a perspective view of the connector of FIG. 1 with the boot and cover removed.

Latch 106 is secured to fiber holder 108 and boot 102 slides relative to fiber holder 108 to provide the push-pull activation of latch 106. When mating the connector 100 to an adapter, boot 102 is pushed forward moving nub 146 forward of ridge 150. This allows the latch arms 152 to engage mounting structure on an LC adapter. To disconnect connector 100 from an adapter, the boot 102 is pulled back, opposite the axis of insertion, causing nub 146 to ride on ridge 150. This deflects arms 152 downwards and releases latch 106 from the LC adapter. FIG. 6 is a perspective view of connector 100 with boot 102 and cover 104 removed.

Figure 7:
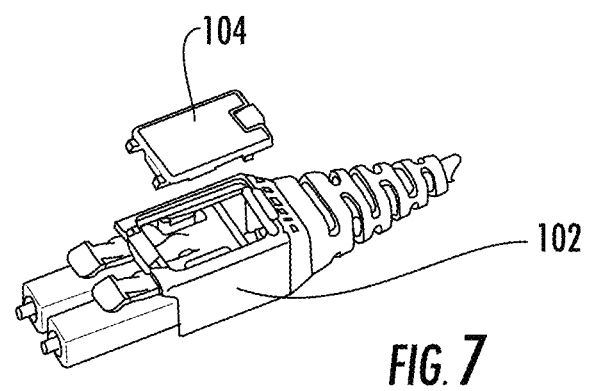
FIGS. 7-10 illustrates changing connector polarity in an exemplary embodiment.
Figure 8:
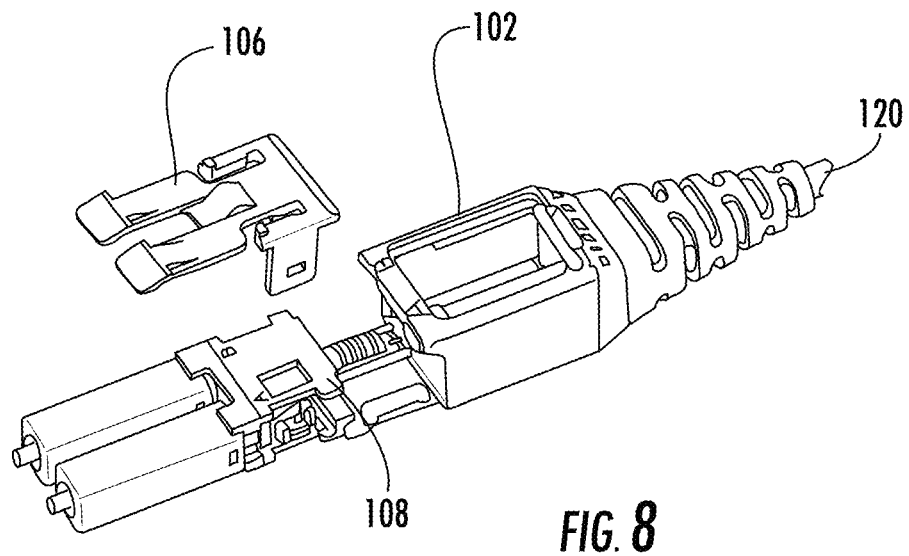

One aspect of embodiments of the invention is the ability to change polarity of the connector without applying undue stress on the optical fibers in cable 120. FIG. 7 illustrates a first step in changing the connector polarity, which involves removing the cover 104 from boot 102. FIG. 8 illustrates a second step in changing the connector polarity. In this second step, the boot 102 is pulled back along the cable 120 to expose the fiber holder 108. Latch 106 is removed from the fiber holder 108.

Figure 9:
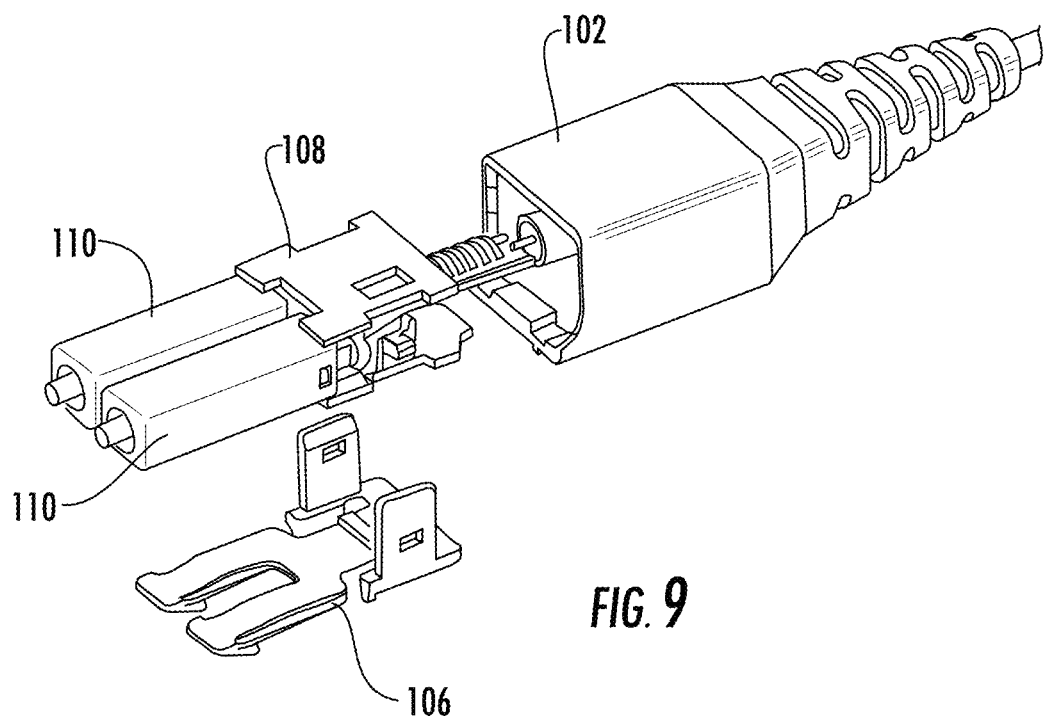

FIG. 9 illustrates a third step in changing the connector polarity. As shown, the boot 102 is rotated 180 degrees and the latch 106 is moved from a first side of the fiber holder 108 to a second side of the fiber holder 108. The fiber holder 108 is not rotated or repositioned. This reduces strain on the optical fibers terminated to the connector bodies 110. Rotating the connector bodies 110, which occurs with prior art designs, can cause torsional stress on the optical fibers. Embodiments of the invention avoid such stresses by maintaining the position of the fiber holder 108 and the connector bodies 110. Further, the terminated connector bodies 110 need not be removed from the fiber holder 108 when changing polarity. This prevents damage to the optical fiber. In traditional designs, when changing the polarity, damage could result from just pulling the connectors out of the holder before rotation.

Figure 10:
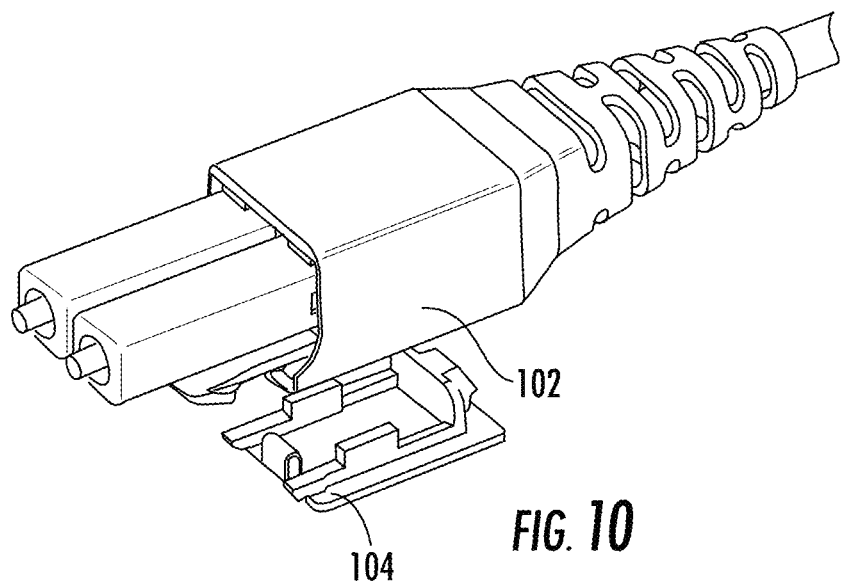

FIG. 10 illustrates a fourth step in changing the connector polarity. As shown in FIG. 10, the fiber holder 108 is repositioned in boot 102 and cover 104 snapped back into position.

Figure 11:
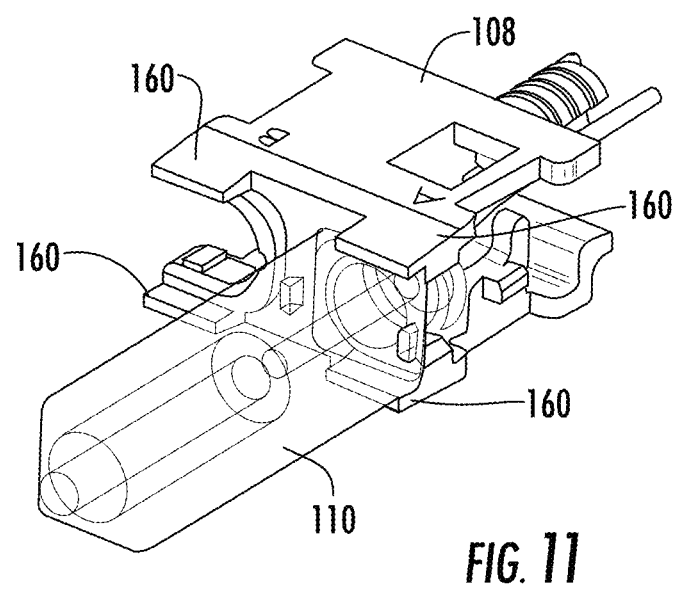
FIG. 11 illustrates a connector body and fiber holder in an exemplary embodiment.

FIG. 11 illustrates interaction between the connector body 110 and fiber holder 108. Fiber holder 108 includes at least one tab 160 extending adjacent to a surface of each connector body 110. The design in FIG. 11 uses two tabs 160 adjacent to each connector body 110. The interference between the tabs 160 and the surface of the connector bodies 110 prevents the connector bodies 110 from rotating. This keeps the connector bodies 110 aligned with the adapter to which connector 100 is mated.

Figure 12:
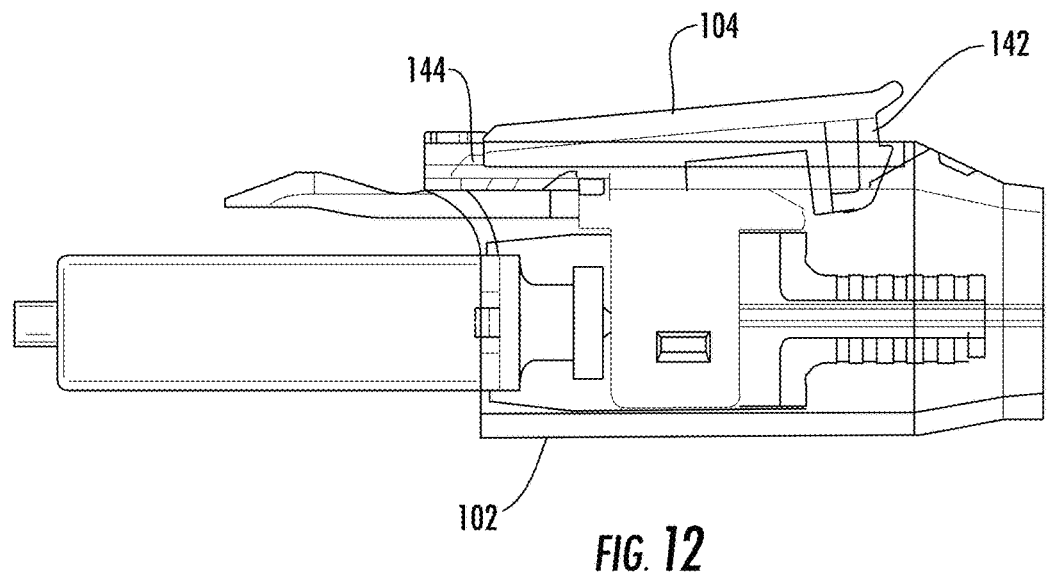
FIG. 12 illustrates mounting the cover to the body in an exemplary embodiment.

FIG. 12 illustrates toolless mounting of cover 104 to body 102.

Figure 13:
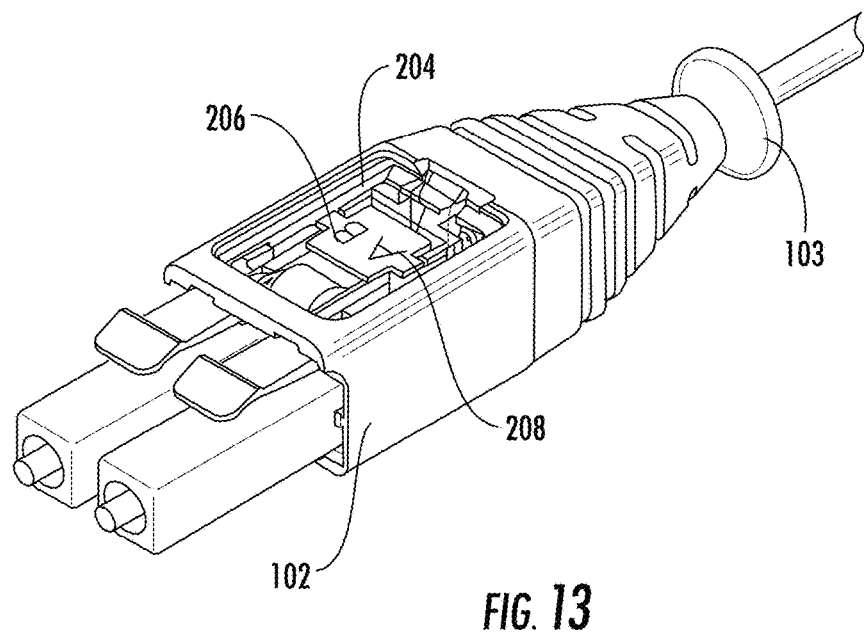
FIGS. 13-16 illustrate a polarity icon in an exemplary embodiment.
Figure 14:
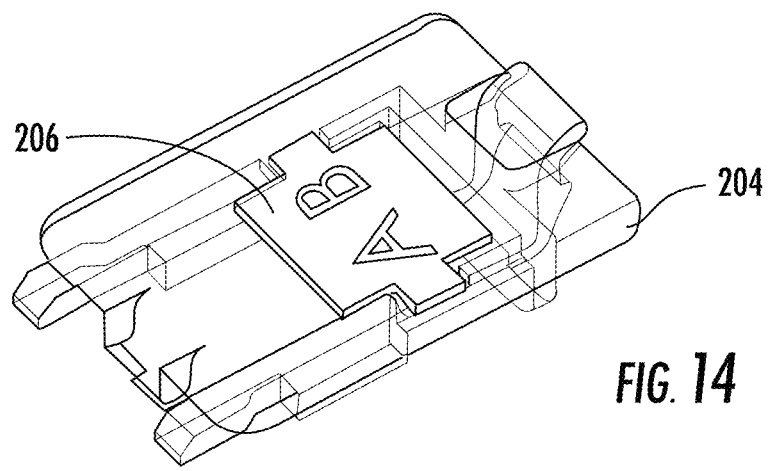
Figure 15:
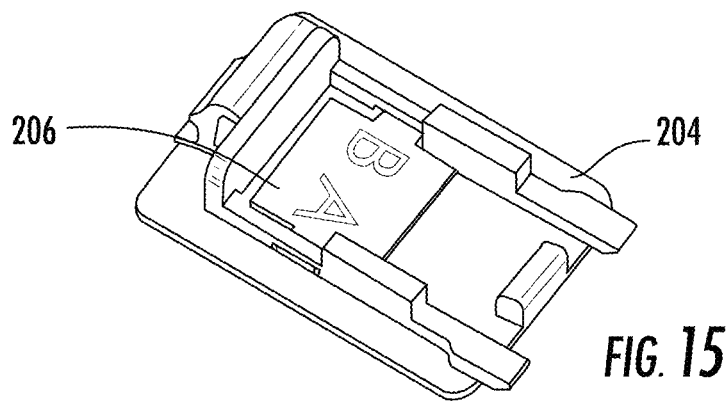

FIG. 13 is a perspective view of connector 100 with an alternate cover 204 and a polarity icon 206. Cover 204 is made from a clear material (i.e., transparent) and allows viewing of polarity icon 206 through cover 204. Polarity icon 206 includes polarity icon indicia 208 which includes two letters, but may include any type of symbol, color coding etc. The polarity icon indicia 208 appears on both sides of polarity icon 206, with the symbols reversed. The orientation of the polarity icon indicia 208 indicates the polarity of the connector 100. Also shown in FIG. 13 is a flared end 103 of boot 102. The flared end 103 helps with strain/bend relief and also provides a lip for the user to pull against when unmating the connector from an adapter. FIG. 14 is a top, perspective view of cover 204 fitted with polarity icon 206. FIG. 15 is a bottom, perspective view of cover 204 and polarity icon 206.

Figure 16:
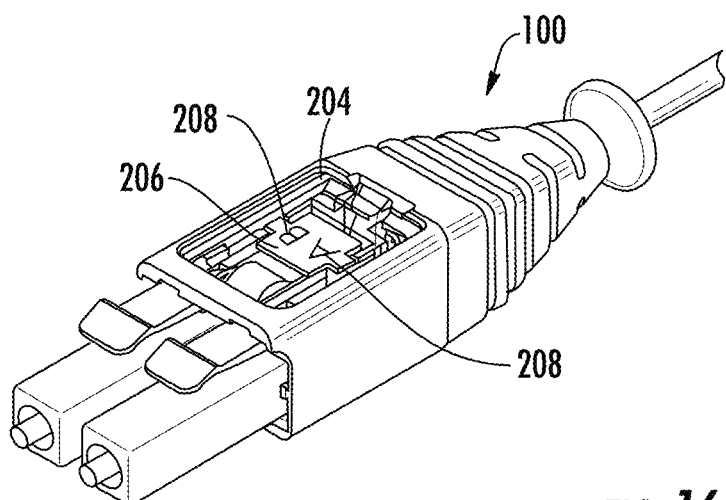

FIG. 16 is a perspective view of connector 100 with cover 204 and a polarity icon 206 after switching polarity relative to FIG. 13. To change polarity of the connector 100, the steps of FIGS. 7-10 discussed above are followed. Further, the polarity icon 206 is flipped by the installer and reinstalled in cover 204. As shown in FIG. 16, the polarity icon indicia 208 is opposite that of FIG. 13, indicating that a change in polarity has occurred from a first polarity configuration to a second polarity configuration. The orientation of the polarity icon indicia 208 indicates the polarity of the connector.

Figure 17:
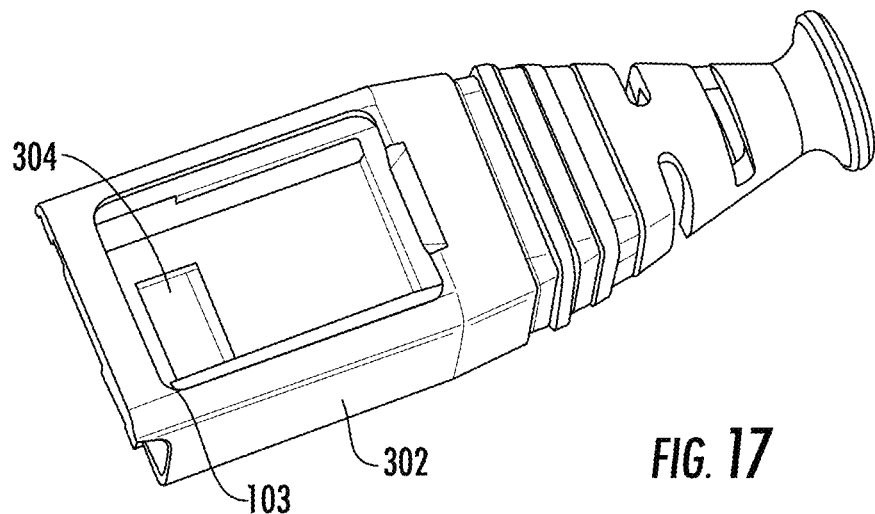
FIGS. 17-19 illustrate polarity indicia in an alternate exemplary embodiment.
Figure 18:
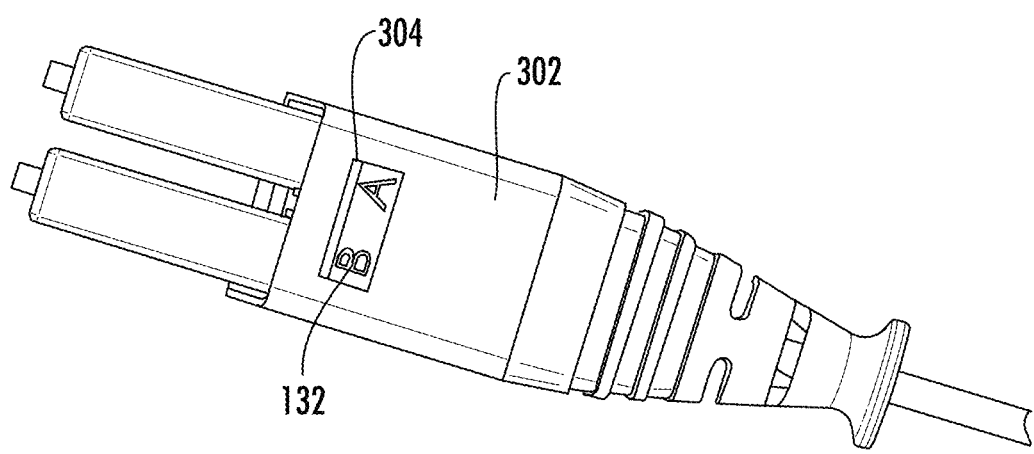
Figure 19:
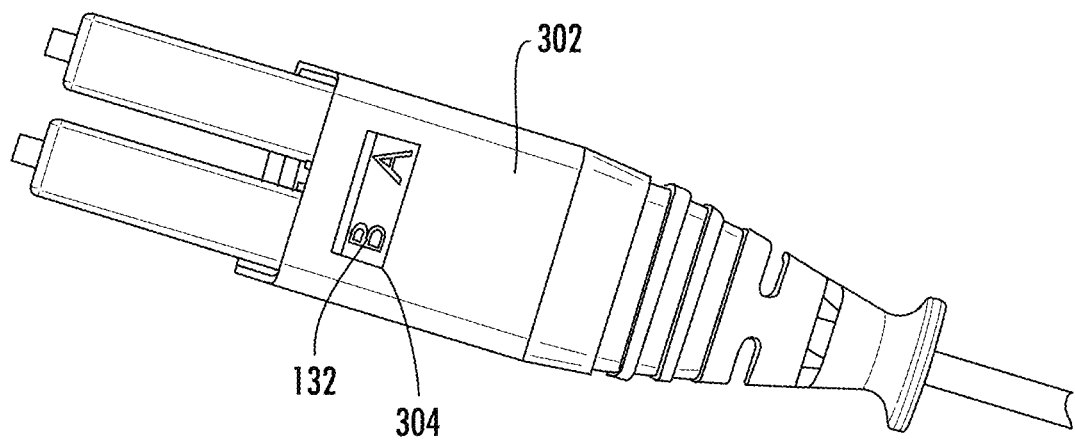

FIG. 17 shows a boot 302 in an alternate embodiment. Boot 302 is similar to boot 102 in FIG. 13, and includes a window 304 formed on an opposite side of cutout 103. Window 304 is generally rectangular and allows viewing of the fiber holder polarity indicia 132 on the top and bottom surfaces of fiber holder 108. FIG. 18 shows the window 304 of boot 302 and the fiber holder polarity indicia 132 visible through window 304. If polarity of the connector is changed (i.e., by rotating the boot 302 relative to the fiber adapter 108 as discussed above), the orientation of the fiber holder polarity indicia 132 changes. FIG. 19 shows the window 304 after the polarity of the connector has been changed relative to FIG. 18. As is shown, the orientation of the fiber holder polarity indicia 132 is now reversed relative to FIG. 18. This allows easy determination of the polarity of the connector.

Figure 20:
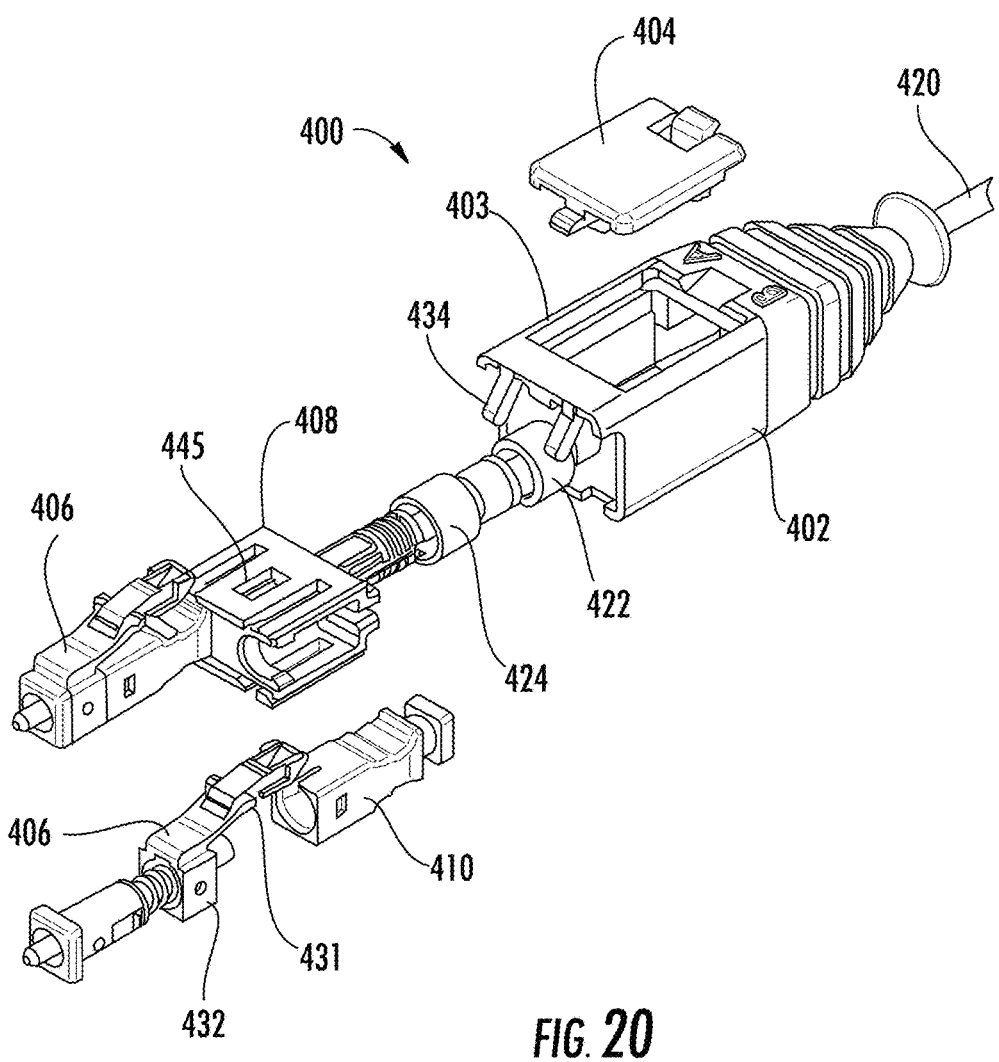
FIG. 20 is an exploded, perspective view of a connector in another exemplary embodiment.

FIG. 20 is an exploded, perspective view of a connector 400 in an alternate embodiment. The connector 400 allows for polarity change of the connector, without rotating the connector bodies as described above. Connector 400 includes individual latches on each connector body and a uni-boot design. Connector 400 includes a boot 402, cover 104, latches 406, fiber holder 408, and connector bodies 410. The connector bodies 410 are LC type connector bodies. It is understood that embodiments may use different connector bodies, and the invention is not limited to LC type connections. A cable 420 runs through boot 402 and includes two optical fibers. Heat shrink material 422, which may be optional, encases at least a portion of cable 420 and a crimp ring 424 secures cable 420 to fiber holder 408. Connector bodies 410 terminate the two optical fibers in cable 420. As described in further detail herein, connector bodies 410 each receive a latch 406, which are used to secure the connector 400 to a duplex adapter.

Figure 21:
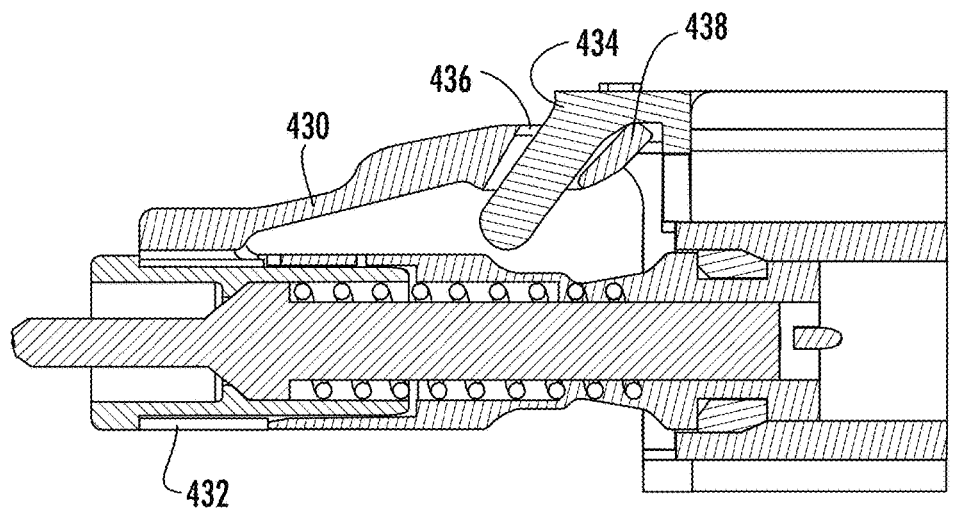
FIG. 21 is a cross-sectional view of a portion of the connector of FIG. 21.

FIG. 21 is a cross-sectional showing the interaction between latch 406 and boot 402. Each latch 406 includes a latch arm 430 that extends in a direction from a front, mating end of connector body 410 towards boot 402. A latch collar 432 (FIG. 20) is used to secure the latch 406 to connector body 410, and is described in further detail herein. Boot 402 includes hooks 434, each of which is received in an opening 436 in a distal free end of latch arm 430. A cam surface 438 is formed on an interior surface of opening 436, near the free, distal end of latch arm 430.

As with the embodiment in FIG. 1, boot 402 moves relative to fiber holder 408. When boot 402 is forward, hooks 434 do not interfere with travel of latch arm 430. Latch arm 430 is resilient and snaps into an adapter for mating with connector bodies 410. A shoulder 431 is formed on latch arm 430 that engages a wall in an adapter, as is conventional for LC type connectors.

To unplug the connector 400, boot 402 is moved backwards, away from the mating end of connector body 410, hooks 434 ride over cam surfaces 438 to deflect latch arm 430 downwards towards connector body 410. This causes the latch arm 430 to become disengaged from an adapter to free the connector 400 from the adapter.

The downward hook design of FIG. 21 provides snag-prevention. When fiber connectors are used as part of cable assemblies in the field, they are snaked and routed through areas that are typically congested with high volumes of cables or other obstacles. When connectors have exposed edges or protrusions, they can become snagged during installation, potentially damaging the connector or other materials in the area. This snagging could occur when another object is swept over the connector in any direction, but is most typically seen when impacted from the back or the front. The downward hook 434 of FIG. 21 allows a smoother surface on the connector 400 and boot 402 to eliminate many possible snag points. The design of hook 434 allows latch arm 430 to have a lower profile and be contained within a region defined by the outside surface of boot 402. As latch arm 430 does not extend beyond an outside surface of boot 402, snag prevention is enhanced.

Figure 22:
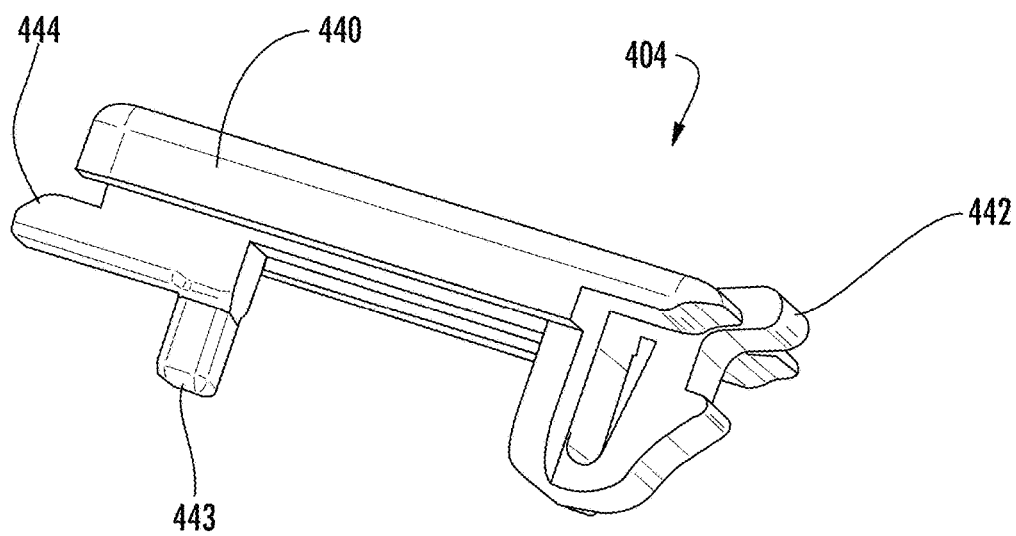
FIG. 22 is a perspective view of a cover in an exemplary embodiment.

FIG. 22 is a perspective view of the cover 404. Cover 404 includes a generally rectangular cover body 440. Extending from a rear of cover body 440 is a resilient latch 442. Latch 442 secures the cover 404 to boot 402. A front edge of body 440 includes a finger 444 that extends away from cover body 440. As shown in FIG. 1, cover 404 is received in a cutout 403 in boot 402. Finger 444 is positioned under one edge of the cutout and latch 442 engages another edge of the cutout. To remove the cover, latch 442 is defeated using a finger or a tool. Tab 443 extends below cover body 440 and travels in slot 445 (FIG. 20) of fiber holder 408 to limit travel of the boot 402 relative to the fiber holder 408 in both the forward and rearward directions.

Latch 406 is secured to connector body 410. Boot 402 slides relative to fiber holder 408 to provide the push-pull activation of latch 406. When mating the connector 400 to an adapter, boot 402 is pushed forward so that hook 434 does not contact cam surface 438. This allows the latch arms 430 to engage mounting structure on an LC adapter. To disconnect connector 400 from an adapter, the boot 402 is pulled back, opposite the axis of insertion, causing hooks 434 to ride over cam surfaces 438. This deflects arms 430 downwards and releases latch 406 from the LC adapter.

Figure 23:
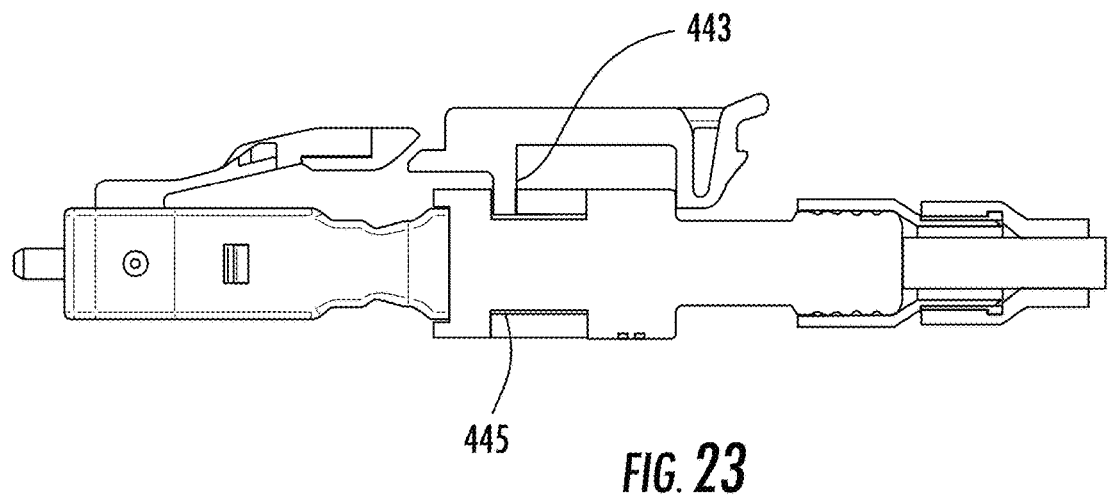
FIG. 23 is a cross-sectional view of a portion of the connector of FIG. 21.

FIG. 23 is a cross-section view showing tab 443 positioned in slot 445. Slot 445 is sized to limit travel of the cover 404, and thus boot 402, relative to the fiber holder 408. This controls position of the hooks 434 relative to latch arms 430 to achieve the desired interaction between the hooks 434 and cam surfaces 438.

Figure 24:
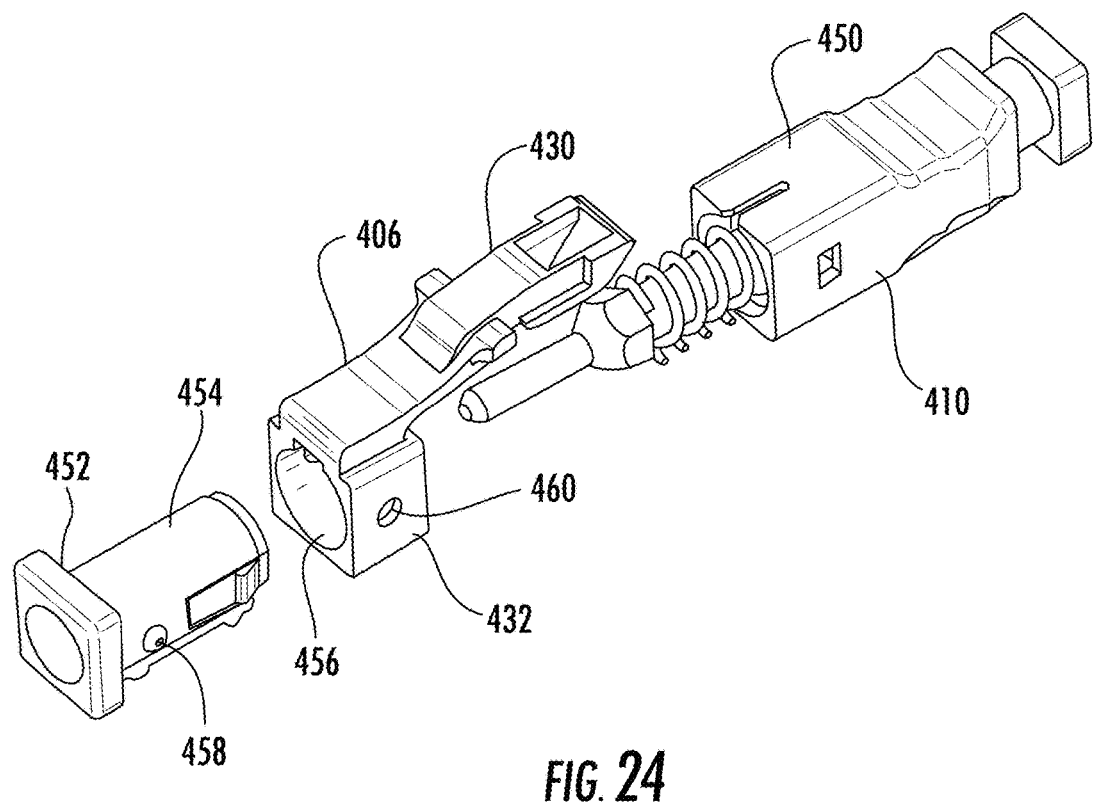
FIG. 24 is an exploded perspective view of a connector body and a latch in an exemplary embodiment.

The embodiment of FIG. 20 also provides the ability to change polarity of the connector without applying undue stress on the optical fibers in cable 420. FIG. 24 is an exploded, perspective view of a connector body 410 and latch 406. Connector body 410 includes a main section 450, which is generally rectangular (e.g., square). A front section 452 includes a cylindrical portion 454 which receives collar 432 of latch 406. Front section 452 mates with main section 450 to enclose a spring-loaded ferrule.

Collar 432 has a generally rectangular outside surface, with an internal, cylindrical opening 456. Collar 432 is positioned over cylindrical portion 454 so that latch 406 can rotate relative to connector body 410. Two nubs 458 on cylindrical portion 454 engage openings 460 in collar 432 to fix the orientation of collar 432 relative to connector body 410. Nubs 458 secure the collar 432 in two positions corresponding to opposite connector polarities (e.g., 0 and 180 degrees), as described in further detail herein. The interference between nubs 458 and openings 460 can be defeated by rotating the collar 432 to disengage the nubs 458 from openings 460.

Figure 25:
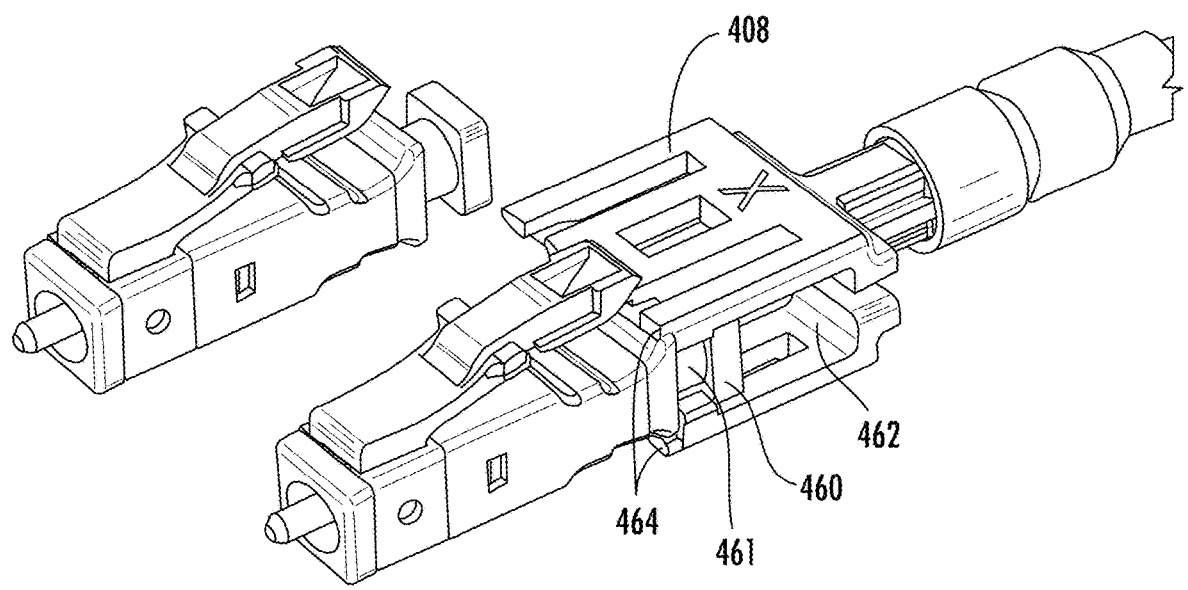
FIG. 25 illustrates interaction between a connector body and a fiber holder in an exemplary embodiment.

FIG. 25 illustrates interaction between the connector body 410 and fiber holder 408. Main section 450 includes a rectangular (e.g., square) anti-rotation block 460 that is received in a similarly shaped channel 462 of fiber holder 408. It is understood that geometries other than square may be used to prevent rotation. A cylindrical neck 461 adjacent to anti-rotation block 460 allows for easy insertion of the connector body 410 into the fiber holder 408. Geometries other than cylindrical may be used for the connector body neck 461 that is inserted into the fiber holder 408. Fiber holder 408 also includes at least one tab 464 extending adjacent to a surface of each connector body 410. The design in FIG. 25 uses two tabs 464 adjacent to each connector body 410. The interference between the tabs 464 and the surface of the connector bodies 410 prevents the connector bodies 410 from rotating when mounted in fiber holder 408. This keeps the connector bodies 410 aligned with the adapter to which connector 400 is mated.

Figure 26:
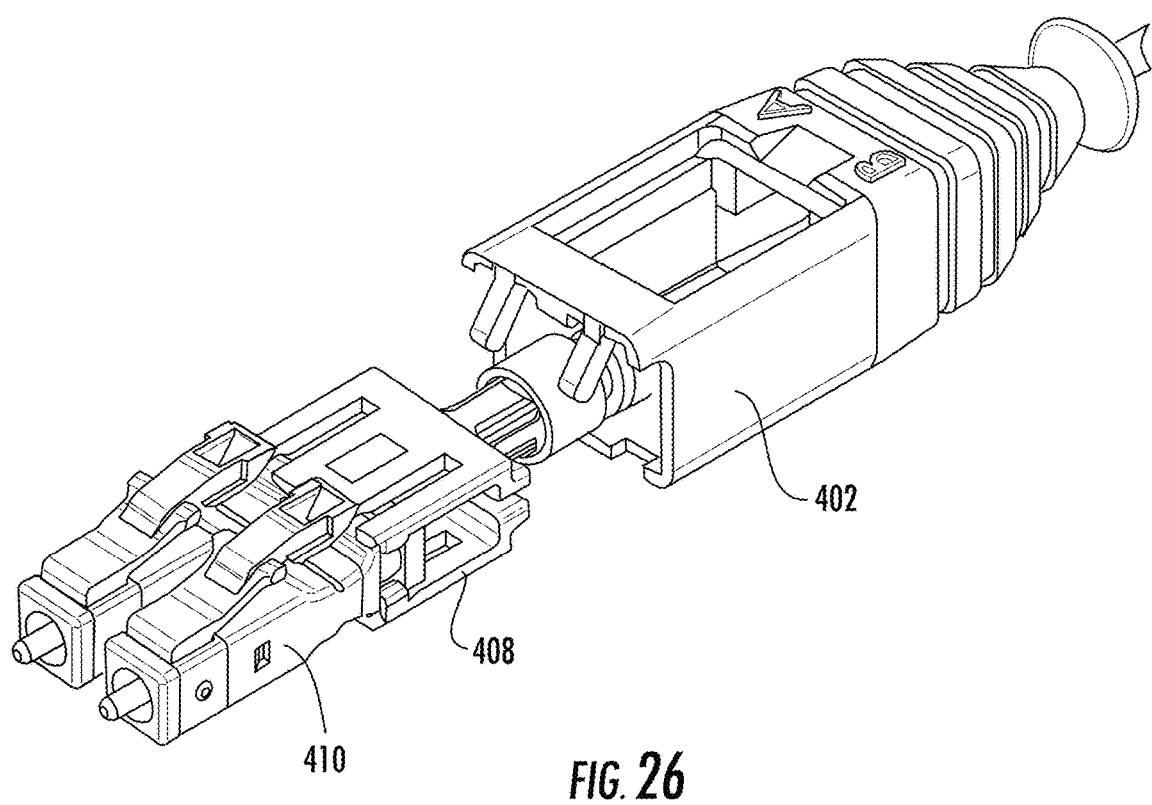
FIGS. 26-28 illustrate changing connector polarity in an exemplary embodiment.

FIG. 26 illustrates a first step in changing the connector polarity, which involves removing the cover 404 from boot 402. Boot 402 is pulled backwards from fiber holder 408 and connector bodies 410. Hooks 434 ride over cam surfaces 438 and exit the latch arm.

Figure 27:
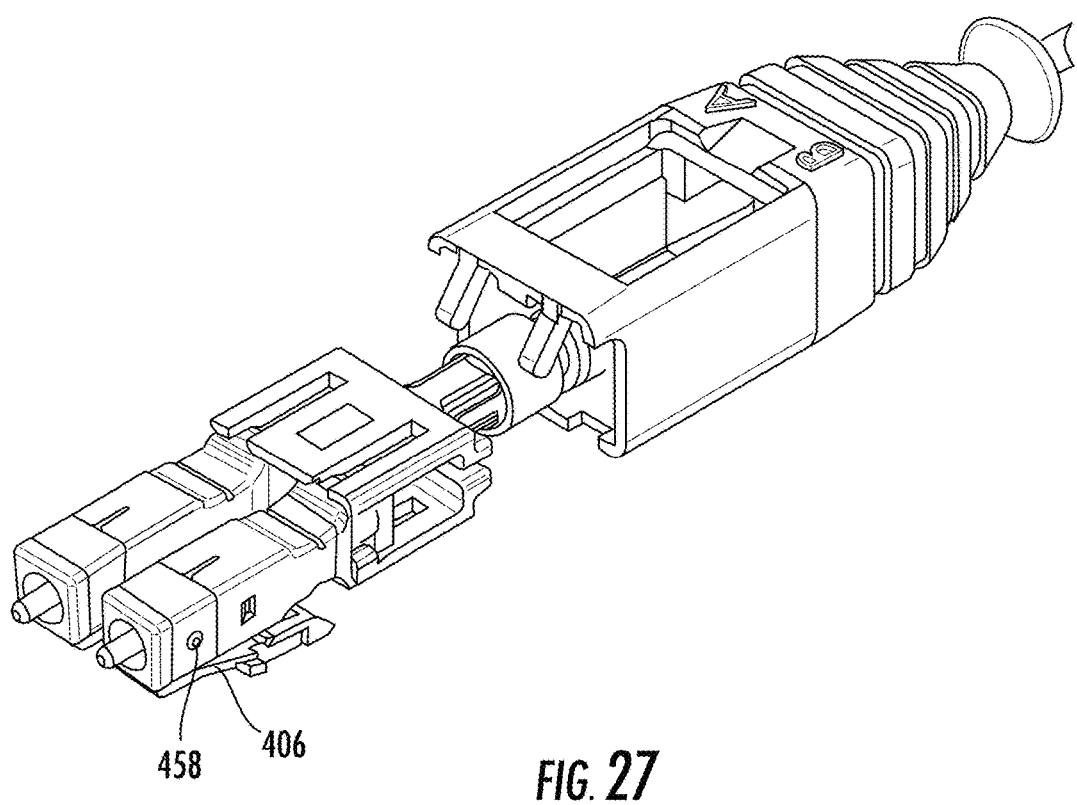

FIG. 27 illustrates a second step in changing the connector polarity. In this second step, latches 406 are rotated 180 degrees. Initial force applied to latch 406 disengages nubs 458 from openings 460 as collar 432 rotates about cylindrical portion 454. As the collar 432 reaches 180 degrees from its initial position, nubs 458 re-engage openings 460 to secure latch 406 in the reversed polarity position.

Figure 28:
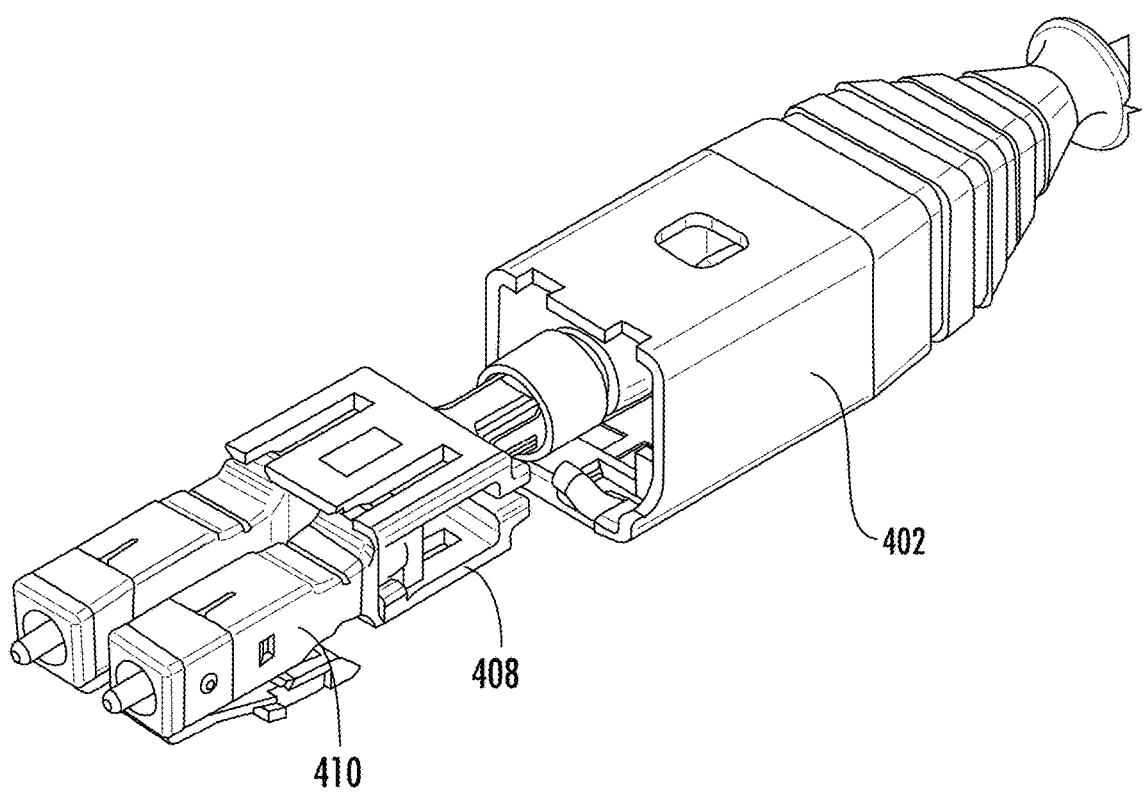

FIG. 28 illustrates a third step in changing the connector polarity. As shown, the boot 402 is rotated 180 degrees. The fiber holder 408 is not rotated or repositioned. This reduces strain on the optical fibers terminated to the connector bodies 410. Rotating the connector bodies 410, which occurs with prior art designs, can cause torsional stress on the optical fibers. Embodiments of the invention avoid such stresses by maintaining the position of the fiber holder 408 and the connector bodies 410. Further, the terminated connector bodies 410 need not be removed from the fiber holder 408 when changing polarity. This prevents damage to the optical fiber. In traditional designs, when changing the polarity, damage could result from just pulling the connectors out of the holder before rotation.

The final steps involve placing the fiber holder 408 back into boot 402 and reinstalling cover 404.

Figure 29:
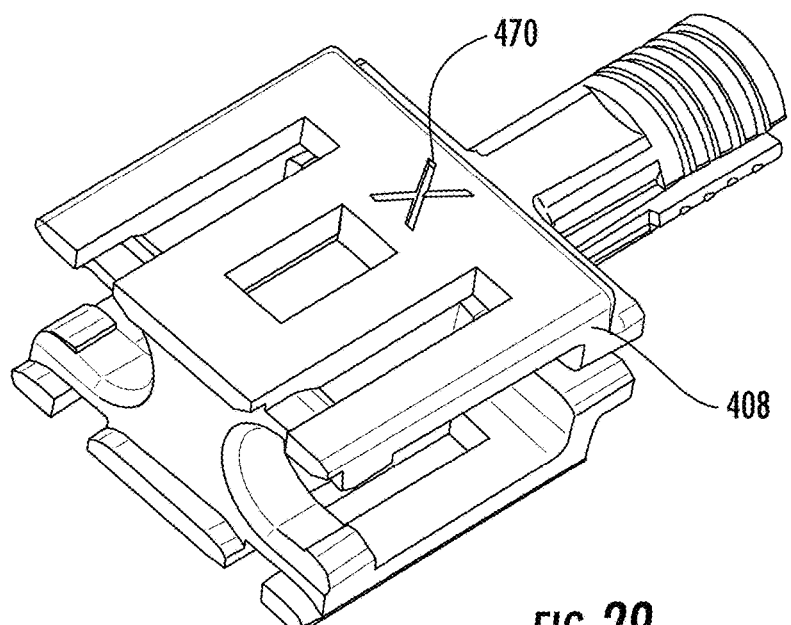
FIGS. 29-30 illustrate fiber holder polarity indicia in an exemplary embodiment.
Figure 30:
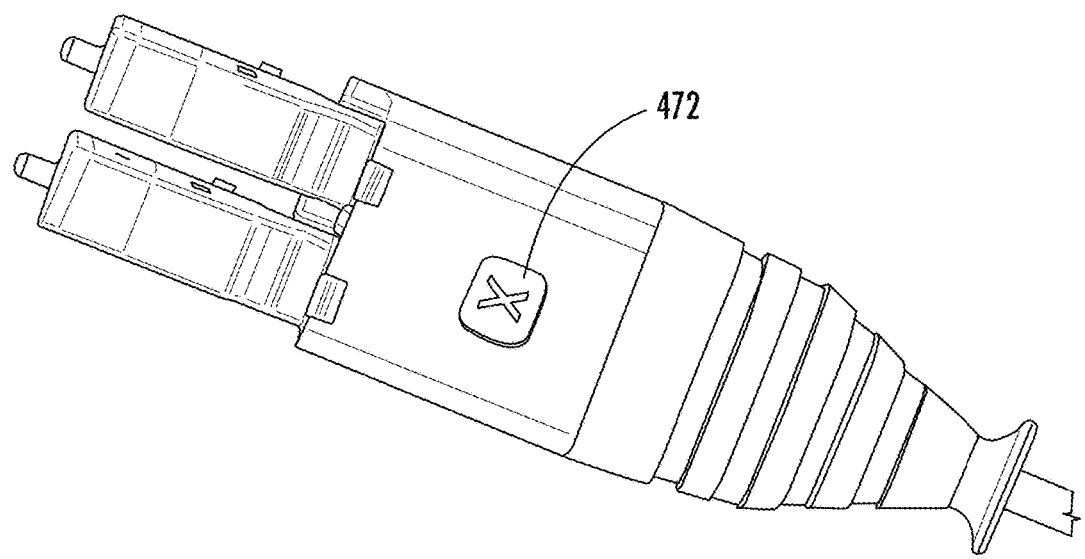

FIG. 29 is a perspective view of the fiber holder 408. Fiber holder 408 includes a fiber holder polarity indicia 470 on one side of the fiber holder. As shown in FIG. 30, boot 402 includes a window 472 for viewing the fiber holder polarity indicia 470. As the fiber holder polarity indicia 470 is formed on only one side of the fiber holder 408, the polarity of connector 400 can be determined based on the presence or absence of the fiber holder polarity indicia 470 in window 472. In alternate embodiments, a different fiber holder polarity indicia 470 is formed on each side of the fiber holder 408 (e.g., A on one side, B on the opposite side) so that one of the fiber holder polarity indicia 470 is presented in window 472 in either polarity orientation.

Embodiments of the invention provide a high-density fiber connector to more easily access and unlatch a fiber LC connector without disturbing nearby connections. Embodiments enable higher density placement of mating adapters. Embodiments allow the user to grasp the connector boot far behind the mating area, where there is less interference from nearby connectors, and pull the boot to disengage the latch. Embodiments also provide damage-free polarity change and indicia to reflect the polarity change.

Embodiments also provide a rotating latch allowing the polarity to be changed without rotating the individual connectors, eliminating the need to twist the fibers, resulting in easier field polarity changes and a more reliable connection. The latch rotates relative to the connector body, and therefore rotates relative to the fiber and the ferrule internal to the connector body, to change polarity. This establishes an easier and more reliable way for users in the field to change polarity of duplex fiber connectors. Although the rotating latch is most beneficial with uniboot-style connectors, it may also be applied to traditional connectors that use duplexing clips.

The rotating latch 406 may be used with LC type connectors, such as the LC products from the Siemon Company. It is understood that the rotating latch may also be used with other types of connectors to provide polarity change. Also, the rotating latch may be used with other types of connectors (e.g., copper) to provide for reorienting latch position without disturbing the signal connections. The rotating latch 406 keeps the connector body positioned within the fiber holder and does not put stresses on the fiber, providing easy, damage-free polarity change.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of this disclosure.

What is claimed is:

1. A fiber optic connector configured to mate with an adapter, the fiber optic connector comprising:
   a boot configured to receive an optical fiber;
   a connector body configured to receive the optical fiber and terminate the optical fiber;
   a fiber holder configured to receive the connector body; and
   a latch coupled to the connector body, the latch repositionable relative to the connector body to enable polarity change of the fiber optic connector without changing a relative position of the connector body and the optical fiber;
   wherein the latch comprises a latch arm configured to engage the adapter;
   wherein the boot is movable relative to the fiber holder;
   wherein the boot and latch arm are coupled such that sliding of the boot relative to the fiber holder causes deflection of the latch arm.

2. The fiber optic connector of claim 1 wherein:
   the latch arm extends towards the boot.

3. A fiber optic connector configured to mate with an adapter, the fiber optic connector comprising:
   a boot configured to receive an optical fiber;
   a connector body configured to receive the optical fiber and terminate the optical fiber; and
   a latch coupled to the connector body, the latch repositionable relative to the connector body to enable polarity change of the fiber optic connector without changing a relative position of the connector body and the optical fiber;
   wherein the latch comprises a latch arm configured to engage the adapter;
   wherein the latch includes a collar configured to engage the connector body, the collar rotatable relative to the connector body.

4. The fiber optic connector of claim 3 wherein:
   the connector body includes a cylindrical portion and the collar includes a cylindrical opening, the cylindrical opening positioned about the cylindrical portion.

5. The fiber optic connector of claim 4 wherein:
   the cylindrical portion includes a nub and the cylindrical opening includes an opening configured to receive the nub to fix the orientation of the collar to the connector body.

6. A fiber optic connector configured to mate with an adapter, the fiber optic connector comprising:
   a boot configured to receive an optical fiber;
   a connector body configured to receive the optical fiber and terminate the optical fiber; and
   a latch coupled to the connector body, the latch repositionable relative to the connector body to enable polarity change of the fiber optic connector without changing a relative position of the connector body and the optical fiber;
   wherein the latch comprises a latch arm configured to engage the adapter;
   the latch arm includes an opening at a distal end of the latch arm; and
   the boot includes a hook positioned in the opening.

7. The fiber optic connector of claim 6 wherein:
   the opening in the latch arm includes a cam surface;
   the hook traveling over the cam surface to deflect the latch towards the connector body.

8. The fiber optic connector of claim 6 wherein:
   the hook points towards the connector body.

9. The fiber optic connector of claim 1 wherein:
   the latch arm extends away from the boot towards a mating end of the connector body.

10. The fiber optic connector of claim 9 further comprising:
    a second connector body for receiving a second optical fiber and terminating the second optical fiber;
    wherein the latch includes two arms, each arm positioned proximate to one of the connector body and the second connector body.

11. The fiber optic connector of claim 10 further comprising:
    a ridge positioned between the two arms;
    the boot including a nub that coacts with the ridge to deflect the arms towards the connector body and second connector body.

12. The fiber optic connector of claim 10 wherein:
    the nub is mounted on a cover secured to the boot.

13. A fiber optic connector comprising:
    a boot configured to receive an optical fiber;
    a connector body configured to receive the optical fiber and terminate the optical fiber; and
    a latch coupled to the connector body, the latch configured to engage an adapter for receiving the fiber optic connector, the latch positioned along a side of the connector body, the latch repositionable relative to the connector body to enable polarity change of the fiber optic connector without changing a relative position of the connector body and the optical fiber;
    wherein the boot includes a window, a polarity indicator visible through the window to indicate a polarity of the fiber optic connector.

14. The fiber optic connector of claim 1 wherein:
    the fiber holder is positioned at least partially in the boot.

15. The fiber optic connector of claim 14 wherein:
the boot includes a window;
a polarity indicator on the fiber holder being visible through the window to indicate a polarity of the fiber optic connector.

16. The fiber optic connector of claim 1 further comprising:
a polarity icon including polarity icon indicia, the polarity icon indicating a polarity of the fiber optic connector by a location of the polarity icon indicia.

17. The fiber optic connector of claim 16 wherein:
the polarity icon includes polarity icon indicia on both sides of the polarity icon.

18. The fiber optic connector of claim 16 wherein:
a portion of the boot is transparent, the polarity icon being viewable through the transparent portion.

19. The fiber optic connector of claim 18 wherein:
the transparent portion is a cover of the boot.

20. The fiber optic connector of claim 14 wherein:
the fiber holder includes at least one tab contacting the connector body to prevent rotation of the connector body.

21. The fiber optic connector of claim 14 wherein:
the fiber holder includes a channel configured to receive the connector body, the channel and the connector body shaped to prevent rotation of the connector.

22. A fiber optic connector configured to mate with an adapter, the fiber optic connector comprising:
a boot configured to receive an optical fiber;
a connector body having a ferrule configured to receive the optical fiber;
a fiber holder configured to receive the connector body; and
a latch coupled to the connector body, the latch repositionable relative to the ferrule to enable polarity change of the fiber optic connector without changing a position of the ferrule and the optical fiber;
wherein the latch comprises a latch arm configured to engage the adapter;
wherein the boot is movable relative to the fiber holder;
wherein the boot and latch arm are coupled such that sliding of the boot relative to the fiber holder causes deflection of the latch arm.

23. The fiber optic connector of claim 1 wherein the latch is repositionable relative to the connector body without rotation of the optical fiber.

24. The fiber optic connector of claim 22 wherein the latch is repositionable relative to the ferrule without rotation of the optical fiber.

* * * * *